US009288295B2

(12) United States Patent
Ivanovski et al.

(10) Patent No.: US 9,288,295 B2
(45) Date of Patent: Mar. 15, 2016

(54) MODULAR MOBILE DEVICE CASE

(71) Applicants: Vladimir Ivanovski, Toronto (CA); Oliver Sandovski, Toronto (CA)

(72) Inventors: Vladimir Ivanovski, Toronto (CA); Oliver Sandovski, Toronto (CA)

( * ) Notice: Subject to any disclaimer, the term of this patent is extended or adjusted under 35 U.S.C. 154(b) by 0 days.

(21) Appl. No.: 14/555,934

(22) Filed: Nov. 28, 2014

(65) Prior Publication Data

US 2015/0133204 A1    May 14, 2015

Related U.S. Application Data

(60) Provisional application No. 61/911,043, filed on Dec. 3, 2013.

(51) Int. Cl.
| | |
|---|---|
| *H04B 1/3888* | (2015.01) |
| *G06F 1/16* | (2006.01) |
| *H05K 7/00* | (2006.01) |
| *H04M 1/02* | (2006.01) |
| *H04B 1/3816* | (2015.01) |
| *H04M 1/18* | (2006.01) |
| *H04M 1/725* | (2006.01) |

(52) U.S. Cl.
CPC ........... *H04M 1/0274* (2013.01); *H04B 1/3816* (2013.01); *H04B 1/3888* (2013.01); *H04M 1/185* (2013.01); *H04M 1/72527* (2013.01)

(58) Field of Classification Search
USPC .................................. 455/414.1, 575.1, 575.8
See application file for complete search history.

(56) References Cited

U.S. PATENT DOCUMENTS

| | | | |
|---|---|---|---|
| 7,889,498 B2 | 2/2011 | Diebel et al. | |
| 8,390,255 B1 * | 3/2013 | Fathollahi | H02J 7/0045 206/308.3 |
| 8,787,009 B2 | 7/2014 | Wilson et al. | |
| 9,123,935 B2 * | 9/2015 | Huang | H01M 10/46 |
| 2011/0199041 A1 * | 8/2011 | Yang | H01M 10/46 320/101 |
| 2012/0154991 A1 | 6/2012 | Lei | |
| 2013/0052871 A1 | 2/2013 | Eklind | |
| 2014/0143459 A1 | 5/2014 | Yang | |

FOREIGN PATENT DOCUMENTS

| | | |
|---|---|---|
| CN | 202444525 U | 9/2012 |
| WO | 2015022615 A2 | 2/2015 |

* cited by examiner

*Primary Examiner* — Blane J Jackson
(74) *Attorney, Agent, or Firm* — Bradley C. Fach; Steven R. Kick; Patentfile, LLC

(57) ABSTRACT

In preferred embodiments, an expandable and modular protective mobile device case apparatus comprises a protective shell configured to receive a mobile device; a circuit board located within the protective shell said circuit board comprising a USB hub and a mode selection switch, wherein the USB hub is in electrical communication with the mode selection switch; and a male plug member in electrical communication with the mode selection switch and configured to transfer electrical signals from the mode selection switch to the mobile device.

20 Claims, 17 Drawing Sheets

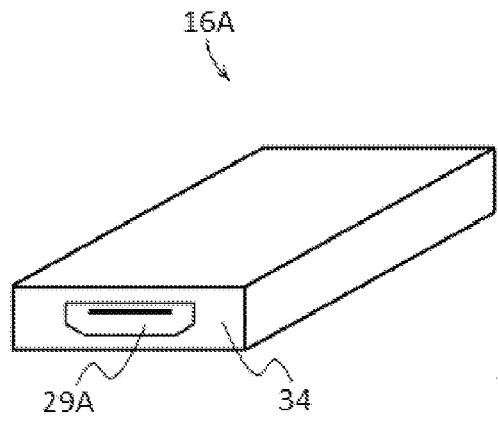
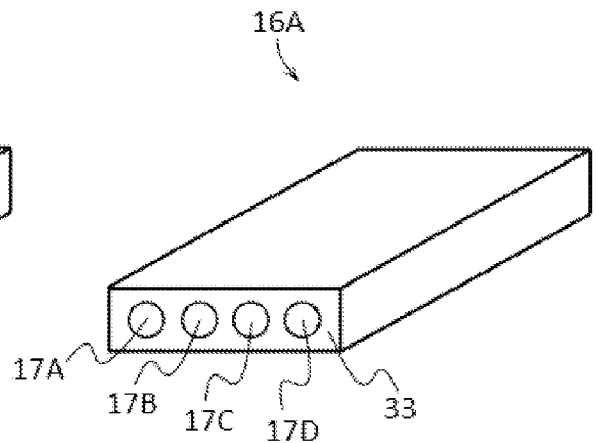
*FIG. 14A*  *FIG. 14B*
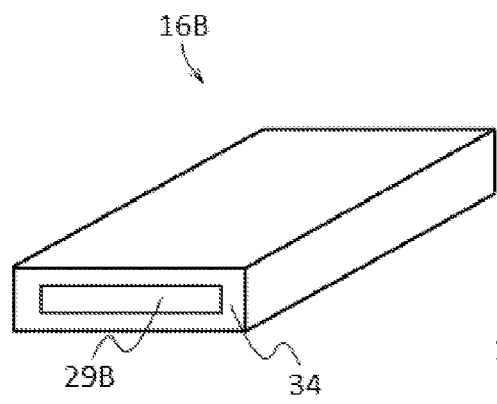
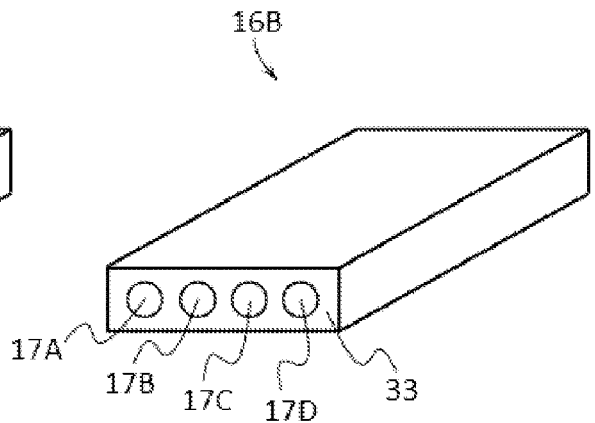
*FIG. 14C*  *FIG. 14D*

MODULAR MOBILE DEVICE CASE

CROSS REFERENCE TO RELATED APPLICATIONS

This application claims priority to and the benefit of the filing date of U.S. Provisional Application No. 61/911,043, filed on Dec. 3, 2013, entitled "EXPANDABLE AND MODULAR PROTECTIVE MOBILE DEVICE CASE COMPRISING A USB HUB AND MEMORY CARD READER(S)", which is hereby incorporated by reference in its entirety.

FIELD OF THE INVENTION

This patent specification relates to a case for portable electronic devices. More specifically, this patent specification relates to a case for portable electronic devices that is configured to connect electronic devices to a portable electronic device in the case.

BACKGROUND

There are many types of portable electronic devices including personal digital assistants (PDAs), computers, smartphones, mobile phones, satellite phones, cellular phones, pagers, music player, MP3 players, media players, digital cameras, video cameras, bar code scanner, global positioning system (GPS), and portable game consoles.

A major restriction of these portable electronic devices is limited storage capacity. Typically, the storage capacity is built into the portable electronic device at the time of manufacture. Often, purchasing the model of mobile device with the most base storage capacity can cost much more than the model with the least amount of capacity. A significant amount of portable electronic devices are only configured with the built in storage capacity and are unable to accept storage capacity upgrades. Also, the current state of portable electronic device manufacturing is such that upgrading the built in storage capacity is beyond the capabilities of most end users if not impossible, leaving the consumer with few options.

There currently exist external electronic modules to expand storage memory; however, they often require cables and adapters, the majority of which are bulky to carry and the sleek form factors of mobile devices are lost once these modules are connected. A further drawback to these modules is that one connected to a portable electronic device, these modules would also be unprotected from shock and vibration.

Some portable electronic devices are able to accept aftermarket electronic devices such as memory cards which may be used to increase or augment the storage capacity of a portable electronic device. Unfortunately, in order to attach these electronic devices, the portable electronic device to which they are to be attached must be partially disassembled. For example, the back case or even the back case and battery must be removed from a majority of portable electronic devices in order to attach a memory card. Since these portable devices are only able to accept one memory card, they must be disassembled every time a memory card is swapped out which has the drawback of increasing the possibility of damaging the portable device. Since most portable electronic devices are also only able to attach one aftermarket electronic device at a time, the user is further limited by what electronic devices they may add to their portable device and the amount of time required to switch an electronic device for another.

Therefore, a need exists for novel apparatuses that are able to attach aftermarket electronic devices to portable electronic devices. There is a further need for novel apparatuses that are able to protect a portable electronic device and any aftermarket electronic devices attached to it from impacts, abrasions, and the like. Finally, there exists a need for a novel apparatus which is able to simultaneously attach different aftermarket electronic devices to a portable electronic device.

BRIEF SUMMARY OF THE INVENTION

In preferred embodiments, an expandable and modular protective mobile device case apparatus comprises a protective shell configured to receive a mobile device; a circuit board located within the protective shell said circuit board comprising a USB hub and a mode selection switch, wherein the USB hub is in electrical communication with the mode selection switch; and a male plug member in electrical communication with the mode selection switch and configured to transfer electrical signals from the mode selection switch to the mobile device.

BRIEF DESCRIPTION OF THE DRAWINGS

Some embodiments of the present invention are illustrated as an example and are not limited by the figures of the accompanying drawings, in which like references may indicate similar elements or components and in which:

FIG. 14A illustrates a front perspective view of an example of an expansion module according to various embodiments described herein.

FIG. 14B shows a back perspective view of the example of an expansion module illustrated in FIG. 14A according to various embodiments described herein.

FIG. 14C depicts a front perspective view of an example of an expansion module according to various embodiments described herein.

FIG. 14D illustrates a back perspective view of the example of an expansion module depicted in FIG. 14C according to various embodiments described herein.

DETAILED DESCRIPTION OF THE INVENTION

Definitions

Figure 1:
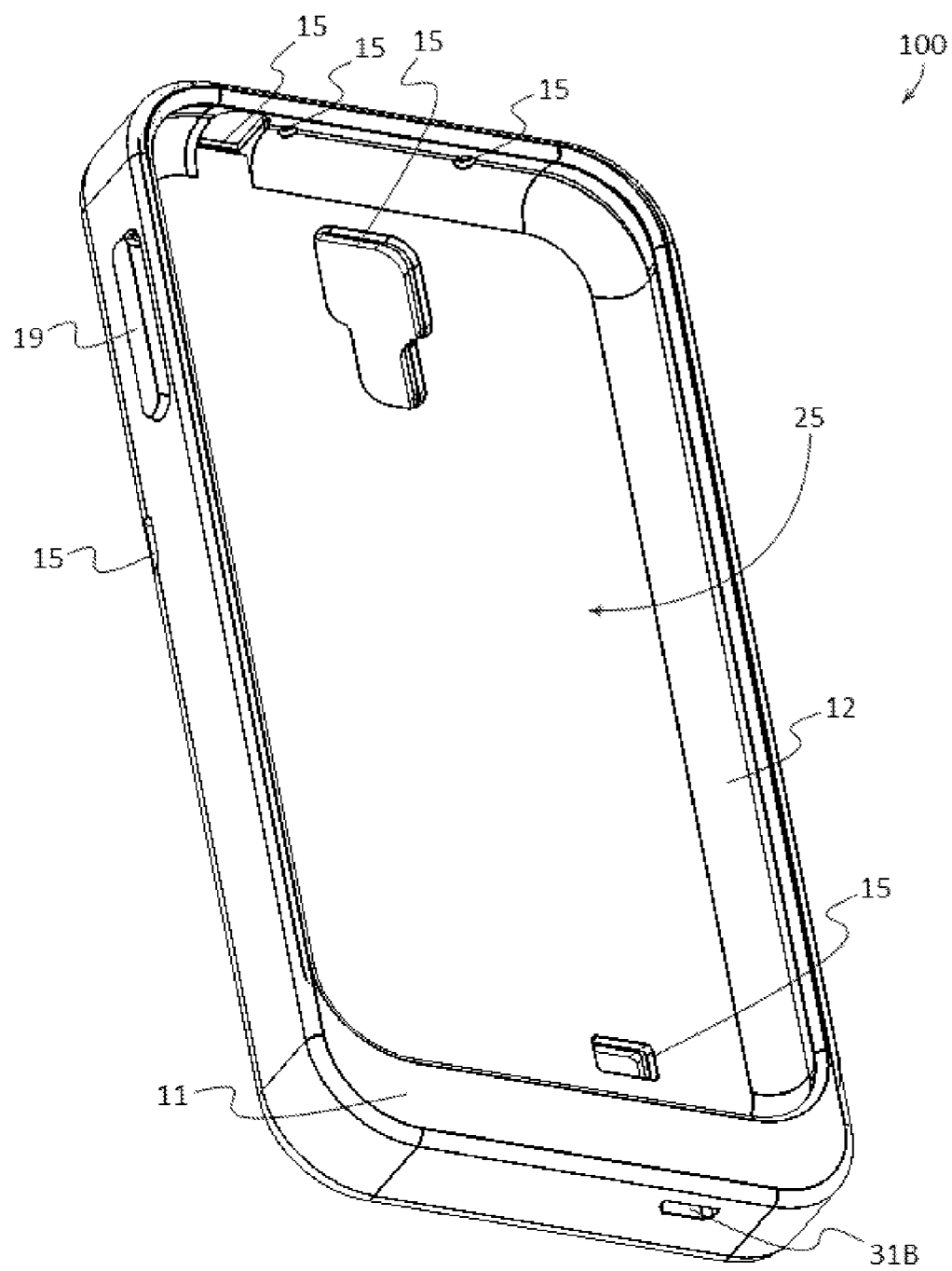
FIG. 1 depicts a front perspective view of an example of an expandable and modular protective mobile device case apparatus according to various embodiments described herein.

The term "electronic device" or "module" as used herein is preferably a type of electronic device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include; personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras with optical zoom and/or lens attachments, external battery packs, external charging devices, HDMI in/out adapters, projectors, and the like. Certain types of electronic devices which are portable and easily carried by a person from one location to another may sometimes be referred to as a "portable electronic device" or "portable device". Some non-limiting examples of portable devices include; cell phones, smart phones, tablet computers, laptop computers, wearable computers such as watches, Google Glasses, etc. and the like.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New electronic device cases and apparatuses are discussed herein that are configured to receive a portable electronic device. It should be understood that for the purposes of understanding the orientation of individual elements or components of the invention, the terms "front" and "front side" shall generally be used to indicate a surface or surface of an element or component that when assembled in an expandable and modular protective mobile device case apparatus, is orientated toward the primary display screen of the portable electronic device. Conversely, for the purposes of understanding the orientation of individual elements or components of the invention, the terms "back" and "back side" shall generally be used to indicate a surface or a surface of an element or component that when assembled in an expandable and modular protective mobile device case apparatus is orientated away from (i.e. faces away from) the primary display screen of the electronic device.

It should also be understood that the terms "right" and "left" are used solely to denote opposite sides of an element, component, or surface in the same manner that "top" and "bottom" are used solely to denote opposite sides of an element, component, or surface and should not unnecessarily be construed as limiting the position or orientation of said element, component, or surface.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
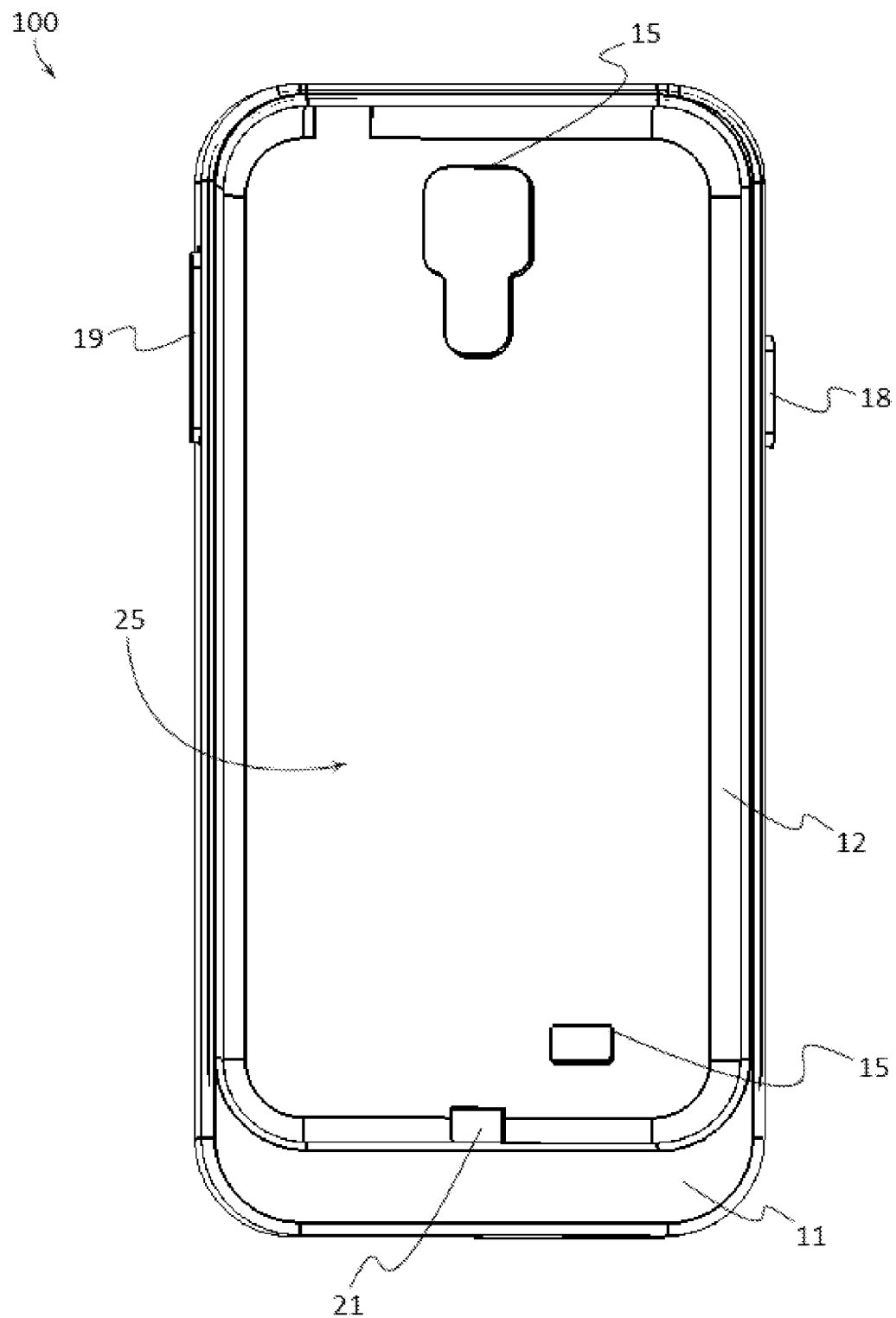
FIG. 2 illustrates a front elevation view of an example of an expandable and modular protective mobile device case apparatus according to various embodiments described herein.
Figure 3:
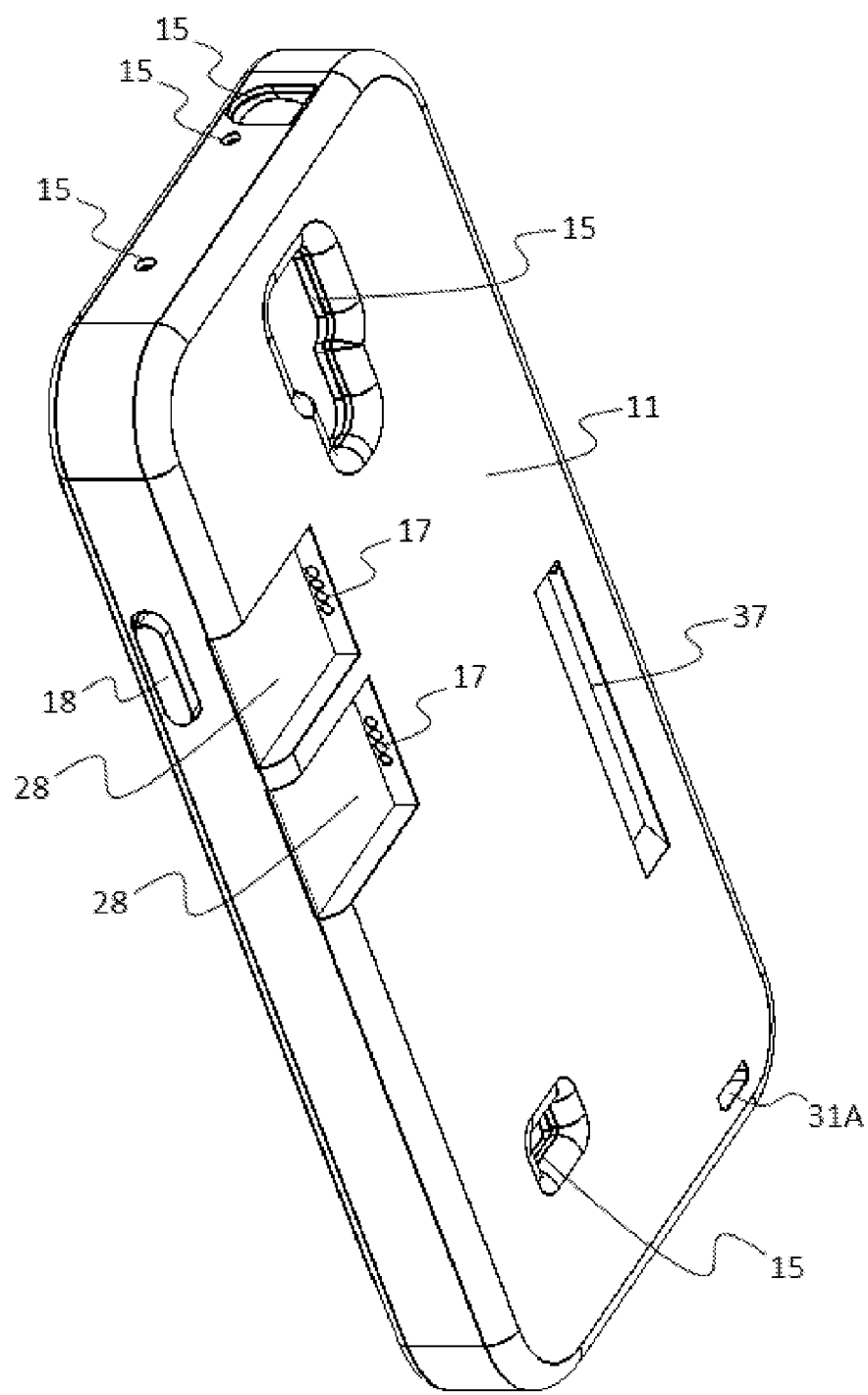
FIG. 3 shows a back perspective view of an example of an expandable and modular protective mobile device case apparatus according to various embodiments described herein.
Figure 4:
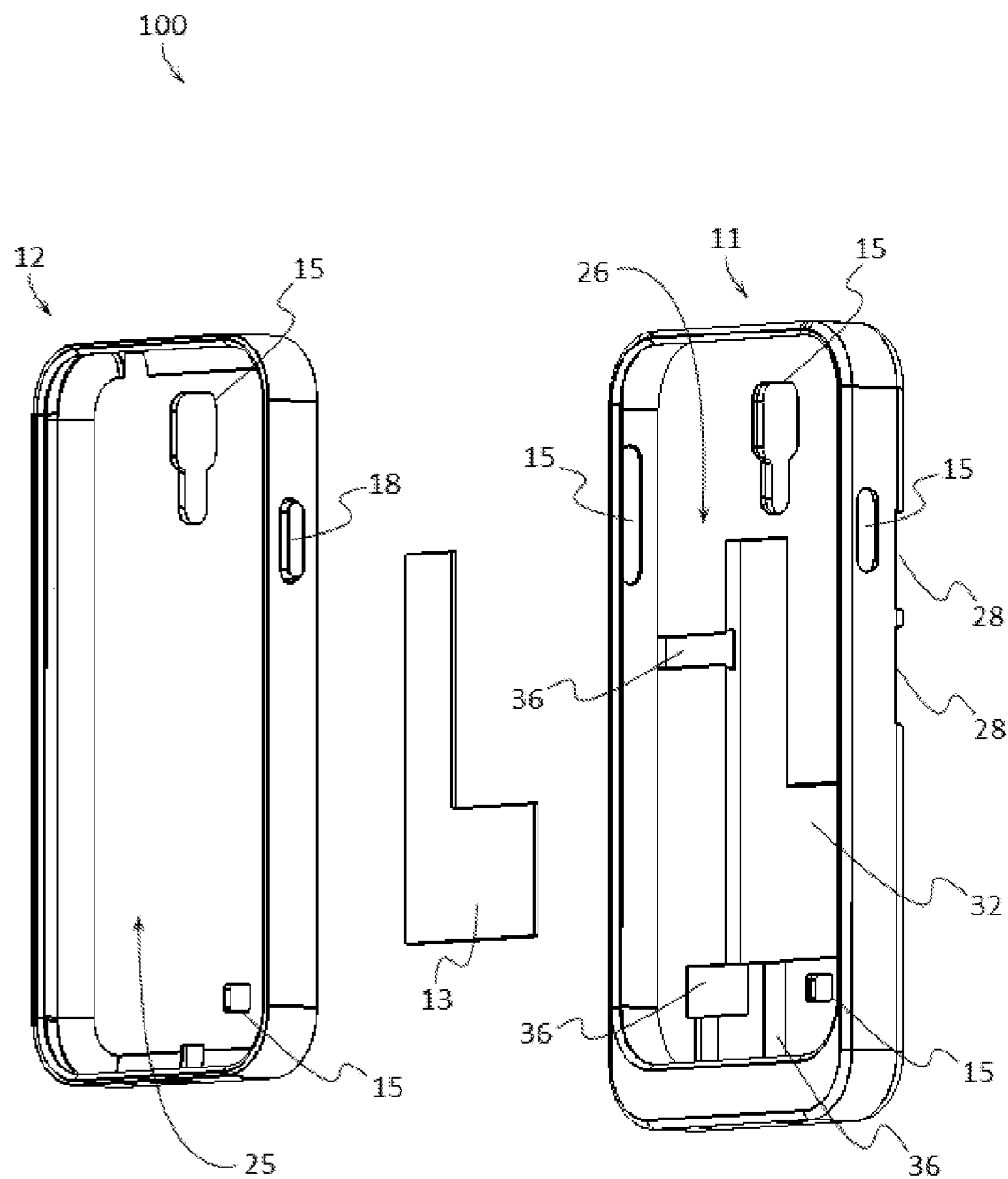
FIG. 4 depicts a perspective exploded view of an example of an expandable and modular protective mobile device case apparatus according to various embodiments described herein.
Figure 5:
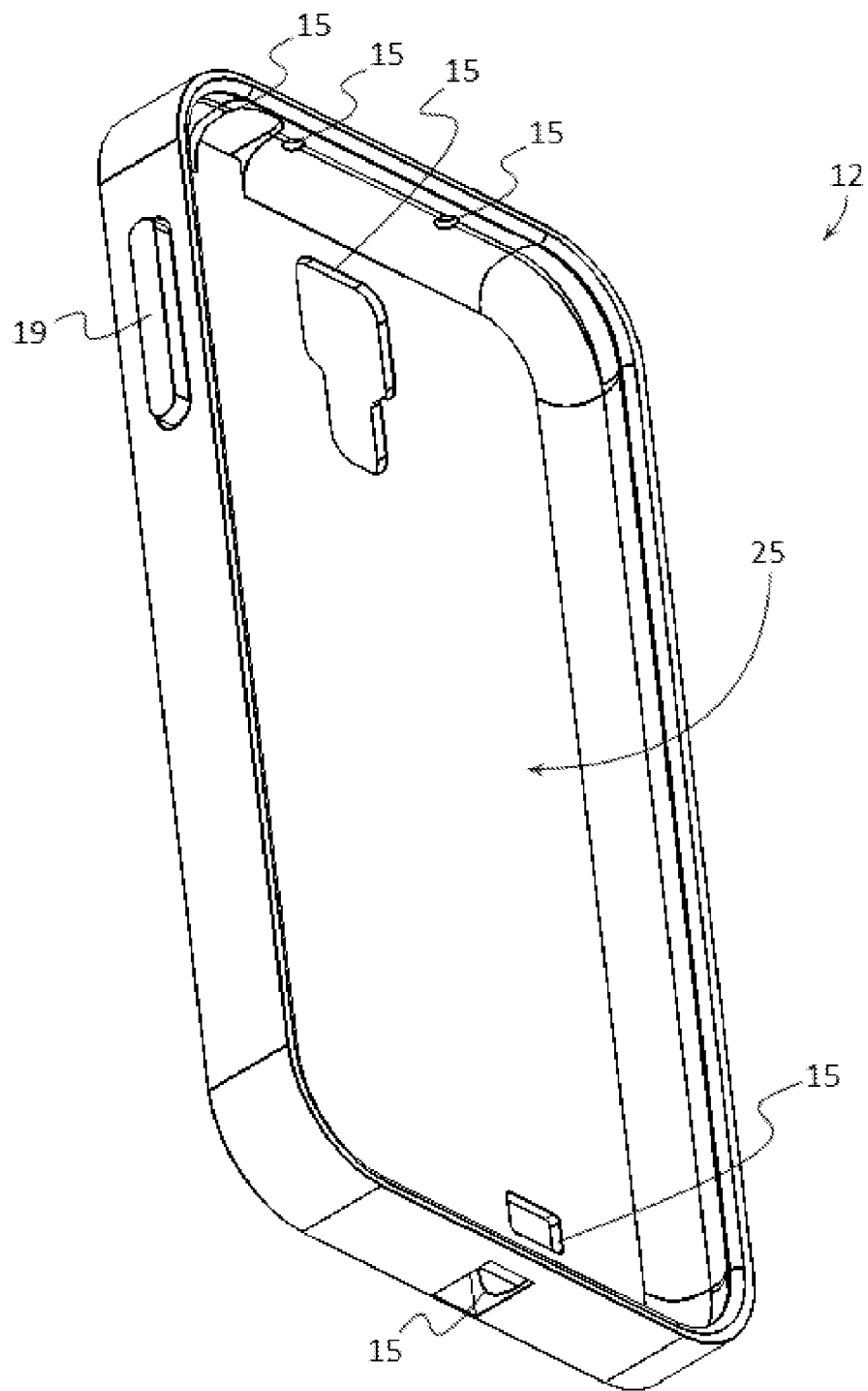
FIG. 5 illustrates a front perspective view of an example of aback plate according to various embodiments described herein.
Figure 6:
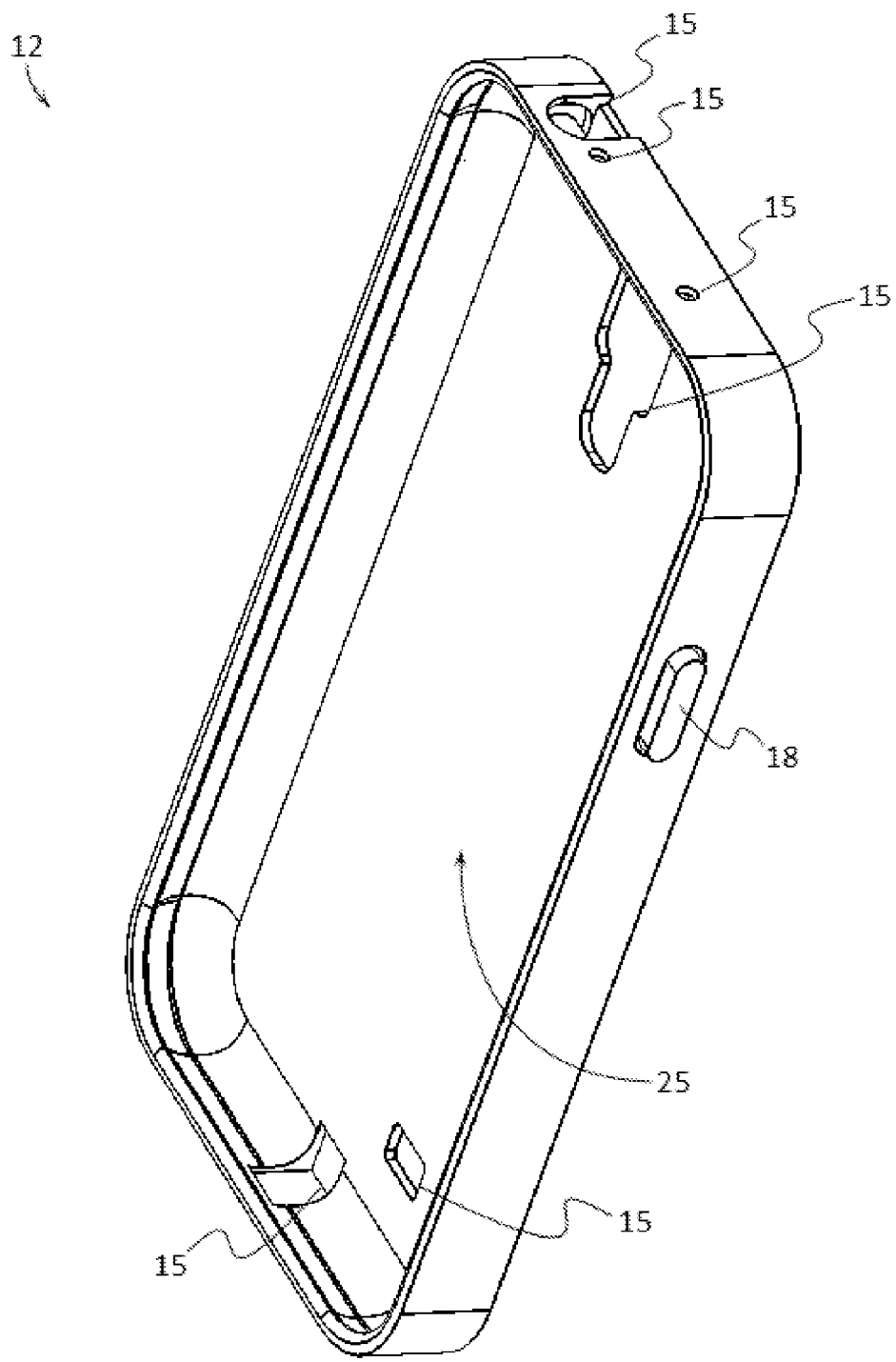
FIG. 6 shows a front perspective view of an example of a back plate according to various embodiments described herein.
Figure 7:
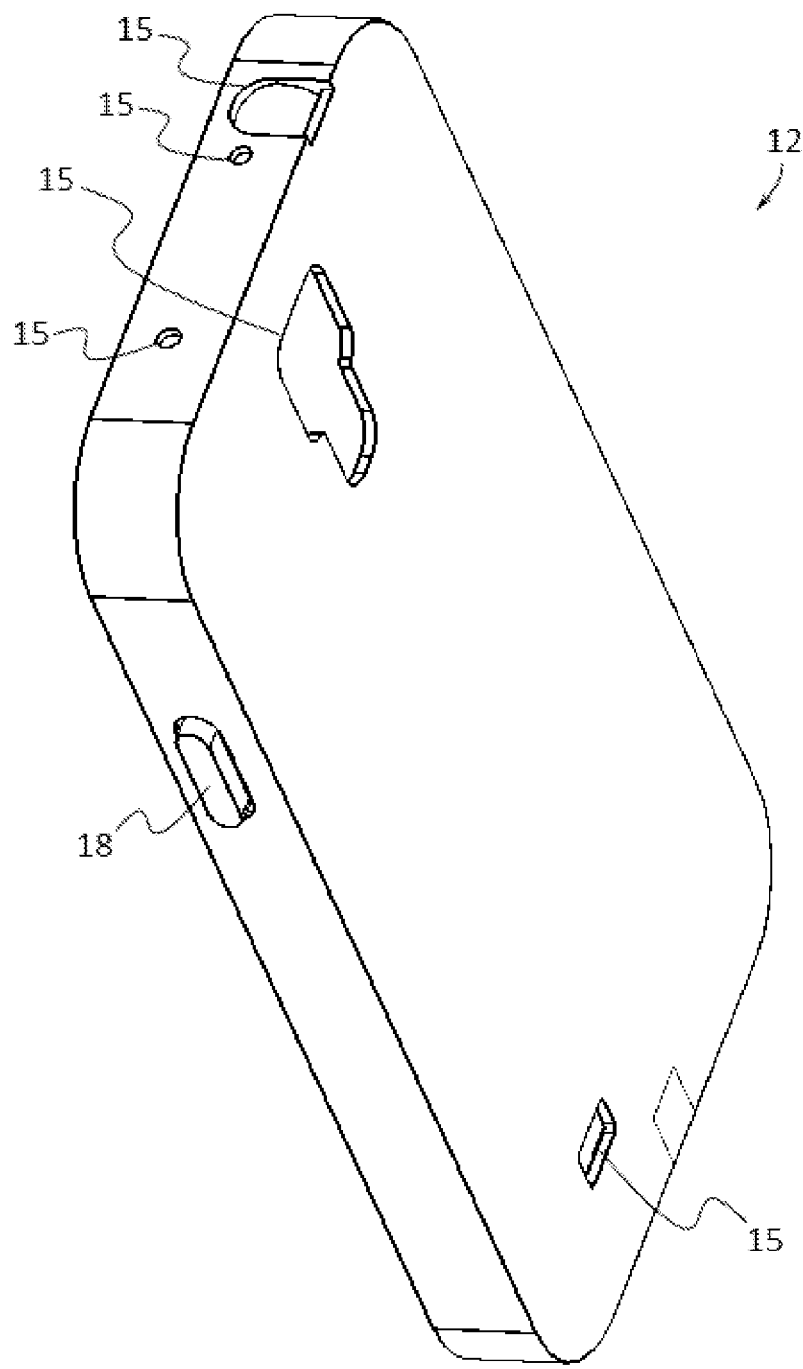
FIG. 7 depicts a back perspective view of an example of a back plate according to various embodiments described herein.
Figure 8:
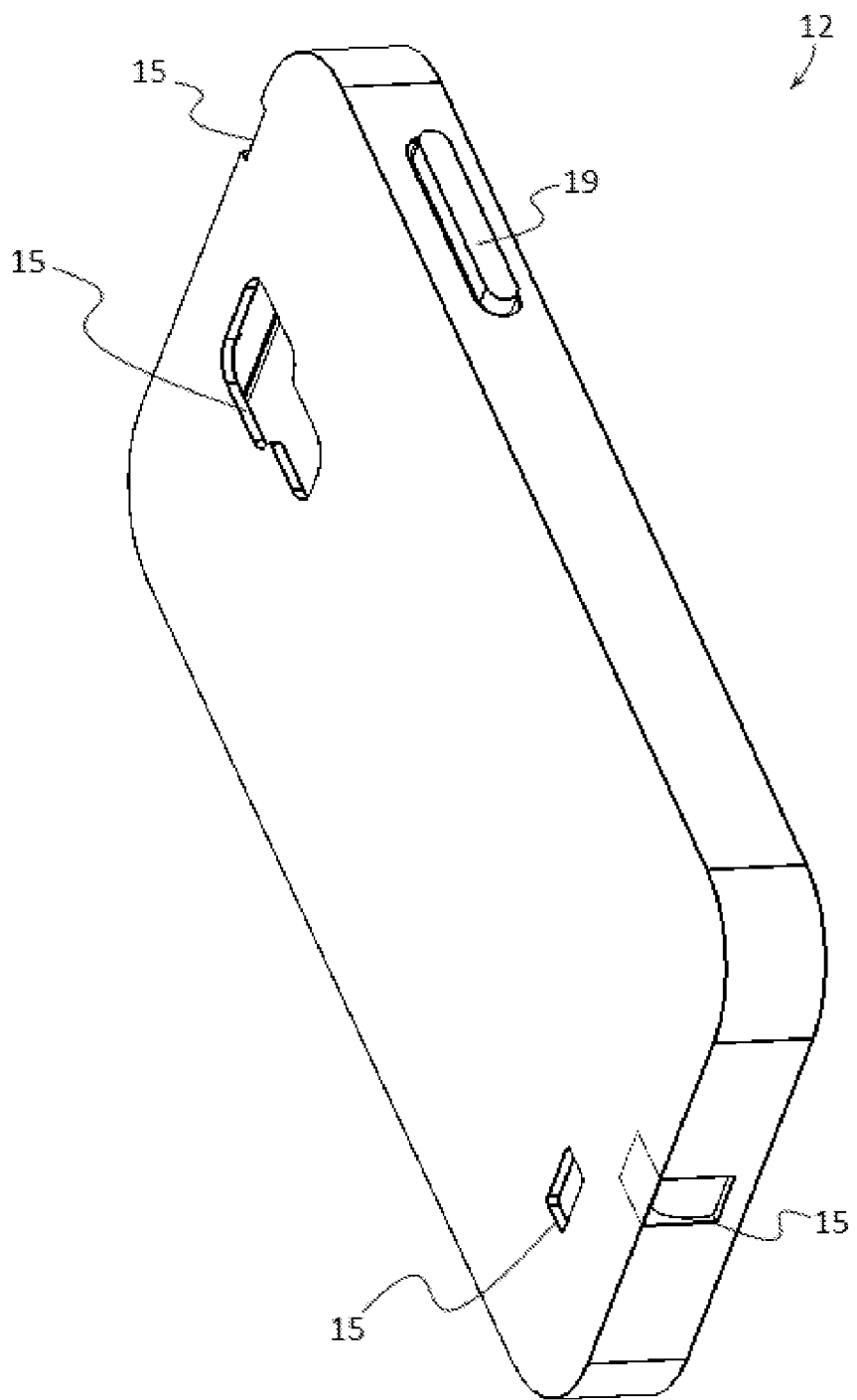
FIG. 8 illustrates a back perspective view of an example of a back plate according to various embodiments described herein.
Figure 9:
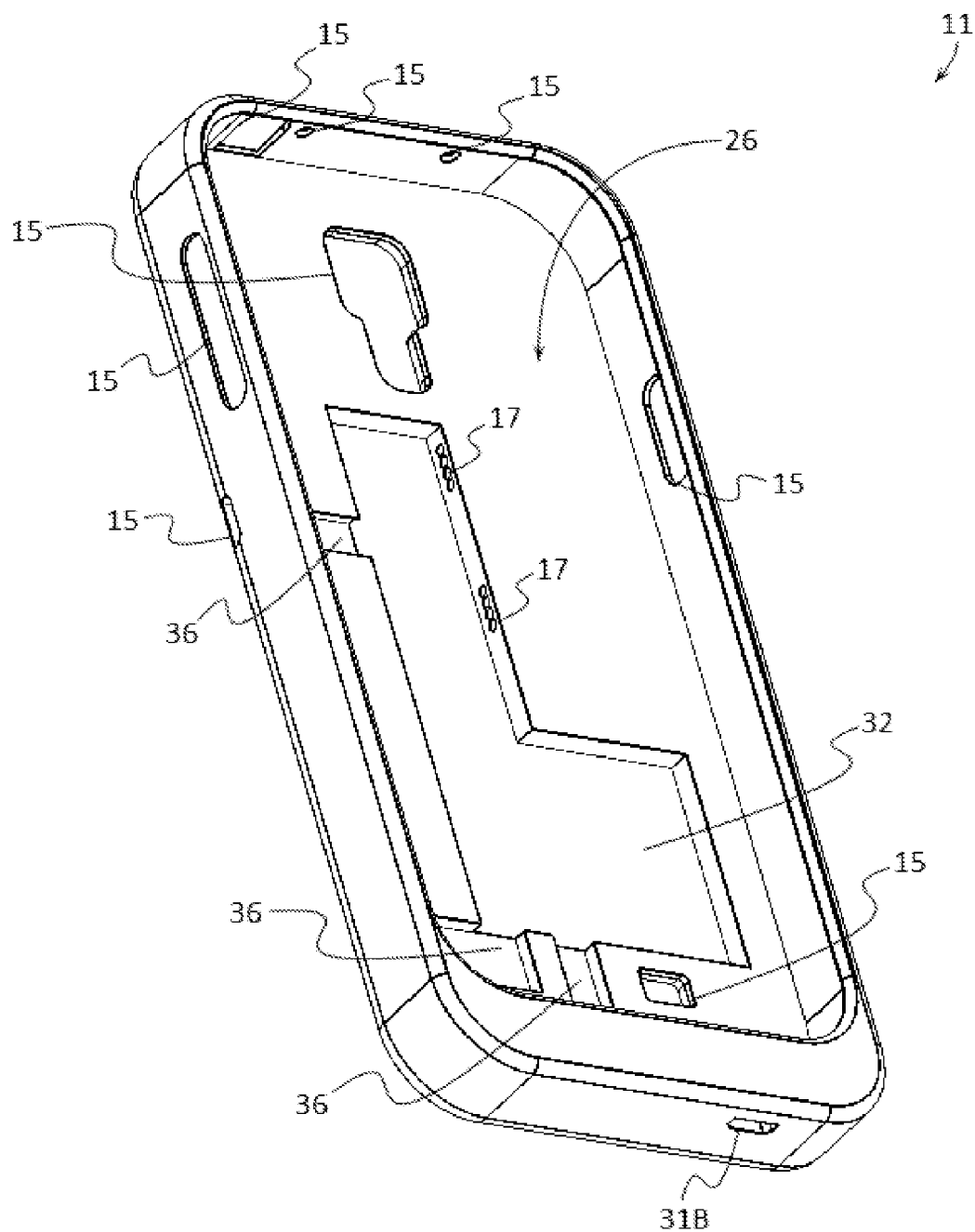
FIG. 9 shows a front perspective view of an example of protective shell according to various embodiments described herein.
Figure 10:
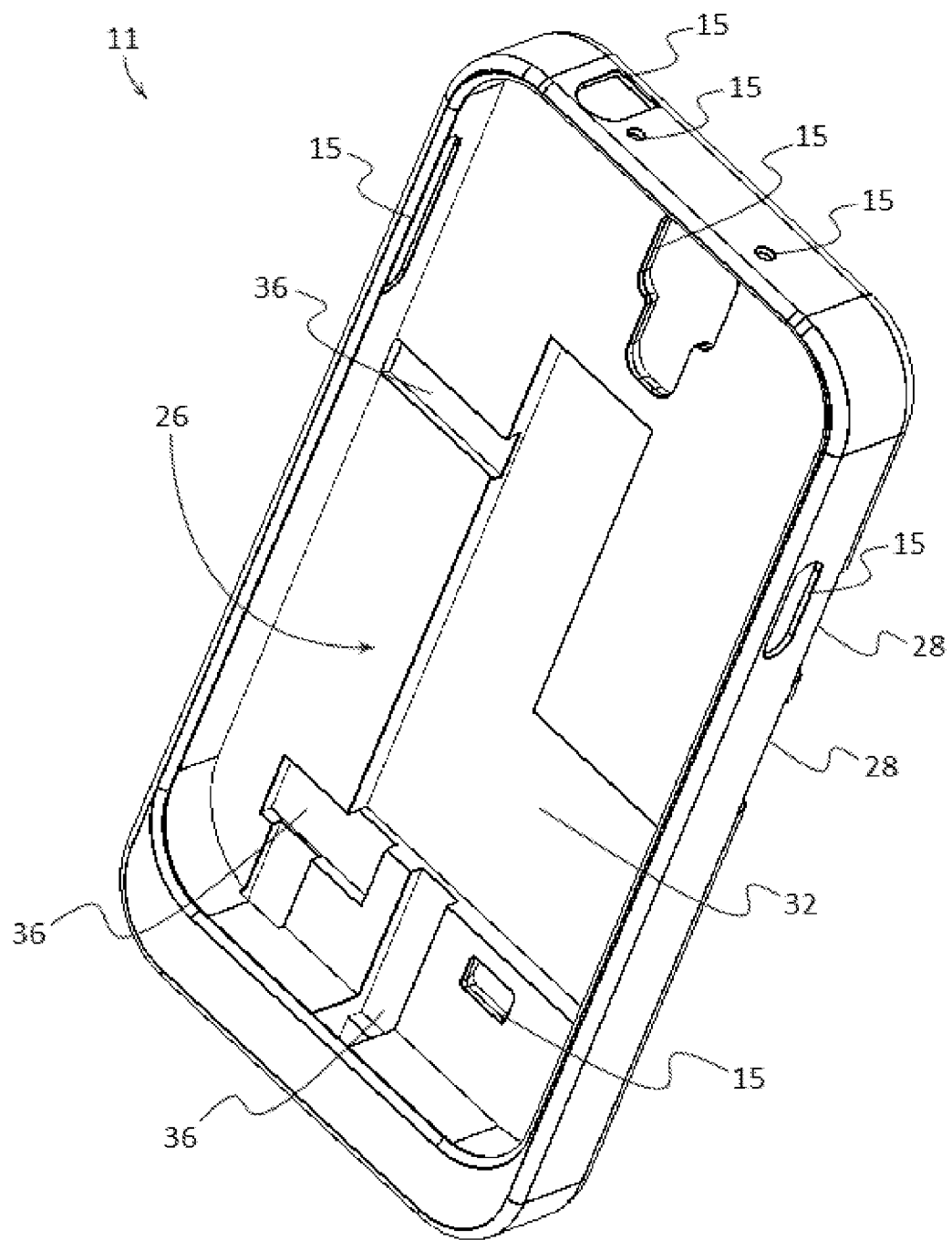
FIG. 10 depicts a front perspective view of an example of protective shell according to various embodiments described herein.
Figure 11:
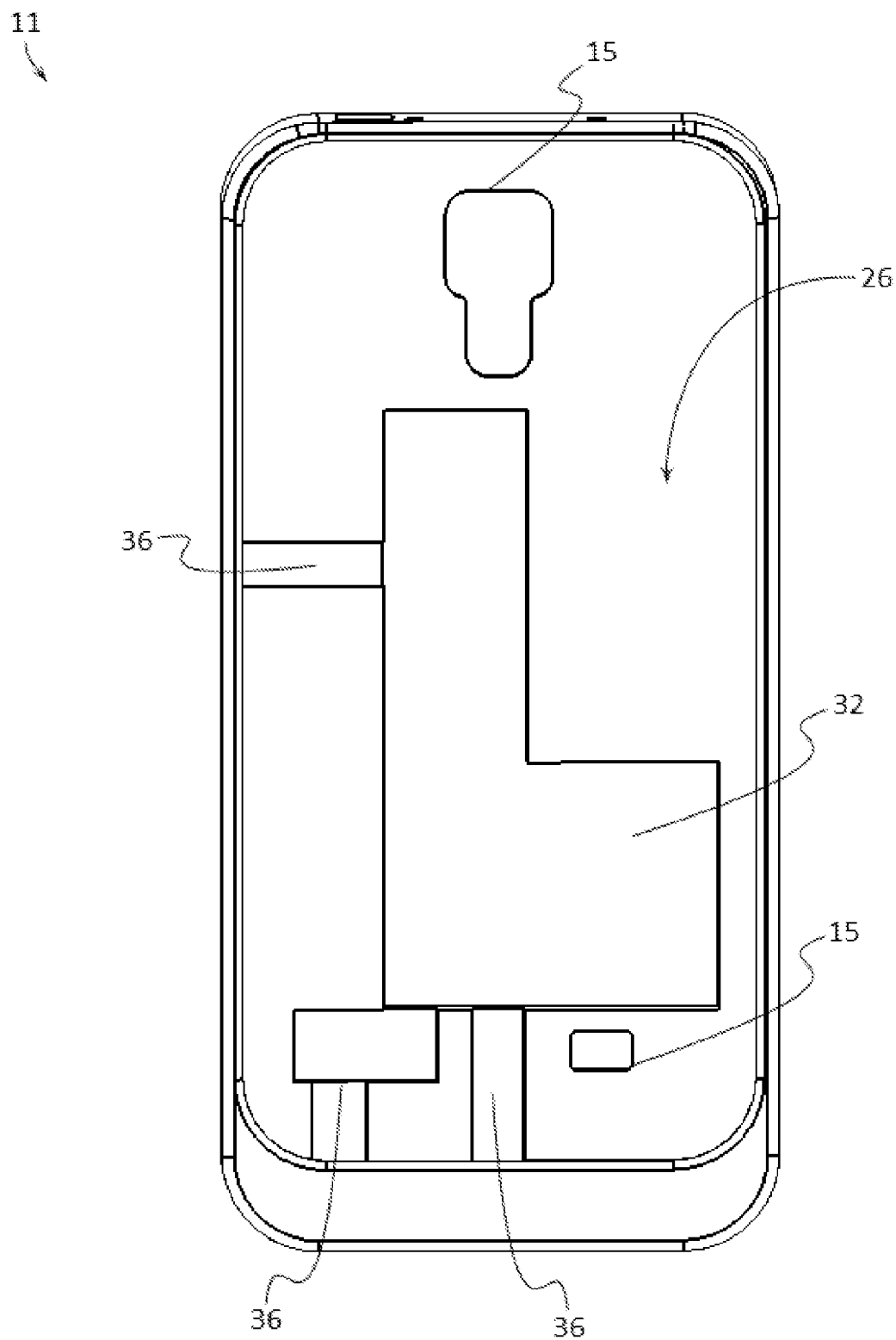
FIG. 11 illustrates a front elevation view of an example of a protective shell according to various embodiments described herein.

The present invention will now be described by example and through referencing the appended figures representing preferred and alternative embodiments. FIGS. 1-3 illustrate three views of an example of an expandable and modular protective mobile device case apparatus ("the case") 100 according to various embodiments, while FIG. 4 shows an exploded view of some of the components of an example of the case 100 according to various embodiments. In this example, the case 100 comprises a protective shell 11, a back plate 12, and a circuit board 13. The circuit board 13 may comprise electrical components of the case 100 and be configured to provide electrical communication between them. In preferred embodiments, the case may comprise a protective shell 11 configured to receive a mobile or portable device; a circuit board 13 coupled to the protective shell said circuit board comprising a USB hub 22 and a mode selection switch 27, wherein the USB hub is in electrical communication with the mode selection switch 27; a male plug member 21 in electrical communication with the mode selection switch 27 and configured to transfer electrical signals from the mode selection switch 27 to the portable device received in the case.

The protective shell 11 may be configured to receive and be coupled to the circuit board 13 and may comprise one or more apertures 15 which are configured to provide access to one or more electrical components and to provide access to various components of a portable electronic device received in the case 100. Preferably, the case 100 may comprise a back plate 12 to facilitate manufacturing by allowing the circuit board 13 to be assembled and then coupled to the case 100 by being encased between the protective shell 11 and the back plate 12. The optional back plate 12 may be configured to be coupled to the circuit board 13 and/or the protective shell 11, thereby encasing the circuit board 13 between the protective shell 11 and the back plate 12. In alternative embodiments, a circuit board 13 may be encased solely in a protective shell 11 with the protective shell 11 formed or coupled around the circuit board 13. In further alternative embodiments, a circuit board 13 may be encased solely in a back plate 12 with the back plate 12 formed or coupled around the circuit board 13. In further alternative embodiments, the circuit board 13 may not be encased by a protective shell 11 and/or a back plate 12 so that portions of the circuit board 13 are visible or accessible without removing portions of a protective shell 11 and/or a back plate 12.

In preferred embodiments, a back plate 12 and/or the protective shell 11 may comprise or be constructed from a softer polymer, elastomer, rubber, or other resilient material to increase protection of the case 100 against drops and shocks. The protective shell 11 and back plate 12 may be integrally formed as a single unit (i.e. through a molding manufacturing process). In some embodiments, for portable device models which use a removable back cover to access the internal circuitry of the portable device, the back plate 12 and/or the protective shell 11 may function as a replacement for the removable back cover of the device. In some embodiments, a back plate 12 may comprise ARTiLAGE foams, Poron foams, silicone foams, rubber foams, plastic foams, neoprene foam, latex foam rubber, polyurenthane foam rubber, or elastomer materials such as elastic plastics, elastic silicone, elastic rubbers, silicone rubbers, or any other suitable elastomer or resilient material.

In further preferred embodiments, the protective shell 11 and/or portions of a back plate 12 may comprise a substantially rigid material such as nylon, polytetrafluoroethylene (PTFE), polyethylene terephthalate (PET), high-density polyethylene (HDPE), polyvinyl chloride (PVC), polypropylene (PP), low density polyethylene (LDPE), other substantially rigid plastics, hard rubbers, resins, ceramics, wood, carbon fiber, glass, metals and metal alloys, or any other suitable substantially rigid material including combinations of materials.

In further preferred embodiments, the circuit board 13 may preferably be flexible and water resistant, with the circuit board 13 preferably placed in between a back plate 12 comprising a resilient material and a protective shell 11 comprising a substantially rigid material, which protects both a portable device received in the case 100 and the circuit board 13 from damage. The protective shell 11 and a back plate 12 may be coupled together and/or to a circuit board 13 with silicone or other suitable material, which may have physical properties to act as an adhesive, to be thermally conductive for the purpose of drawing heat away from temperature-sensitive electronic devices, and to also provide a level of shock and dent protection. In further embodiments, a circuit board 13 may be coupled to a material such as a metal or metal alloy that is capable of acting as a heat sink by absorbing heat from the circuit board 13.

In preferred embodiments, a circuit board 13 and/or an optional back plate 12 are coupled to the protective shell 11. The protective shell 11, circuit board 13, and/or an optional back plate 12 may be coupled be being connected, removably connected, or integrally formed or molded with the case 100. In some embodiments, the protective shell 11, circuit board 13, and/or an optional back plate 12 may be coupled or connected together with heat bonding, chemical bonding, thermally conductive epoxy, silicone adhesives, metal-oxide ceramic adhesives, other adhesives, clasp type fasteners, clip type fasteners, rivet type fasteners, threaded type fasteners, other types of fasteners, or any other suitable joining method.

In other embodiments, the protective shell 11, circuit board 13, and/or an optional back plate 12 may be coupled or removably connected by being press fit or snap fit together, by one or more fasteners such as magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, the protective shell 11, circuit board 13, an optional back plate 12, and/or any other component described herein may be coupled by being one of connected to and integrally formed with another component of a case 100.

Figure 12:
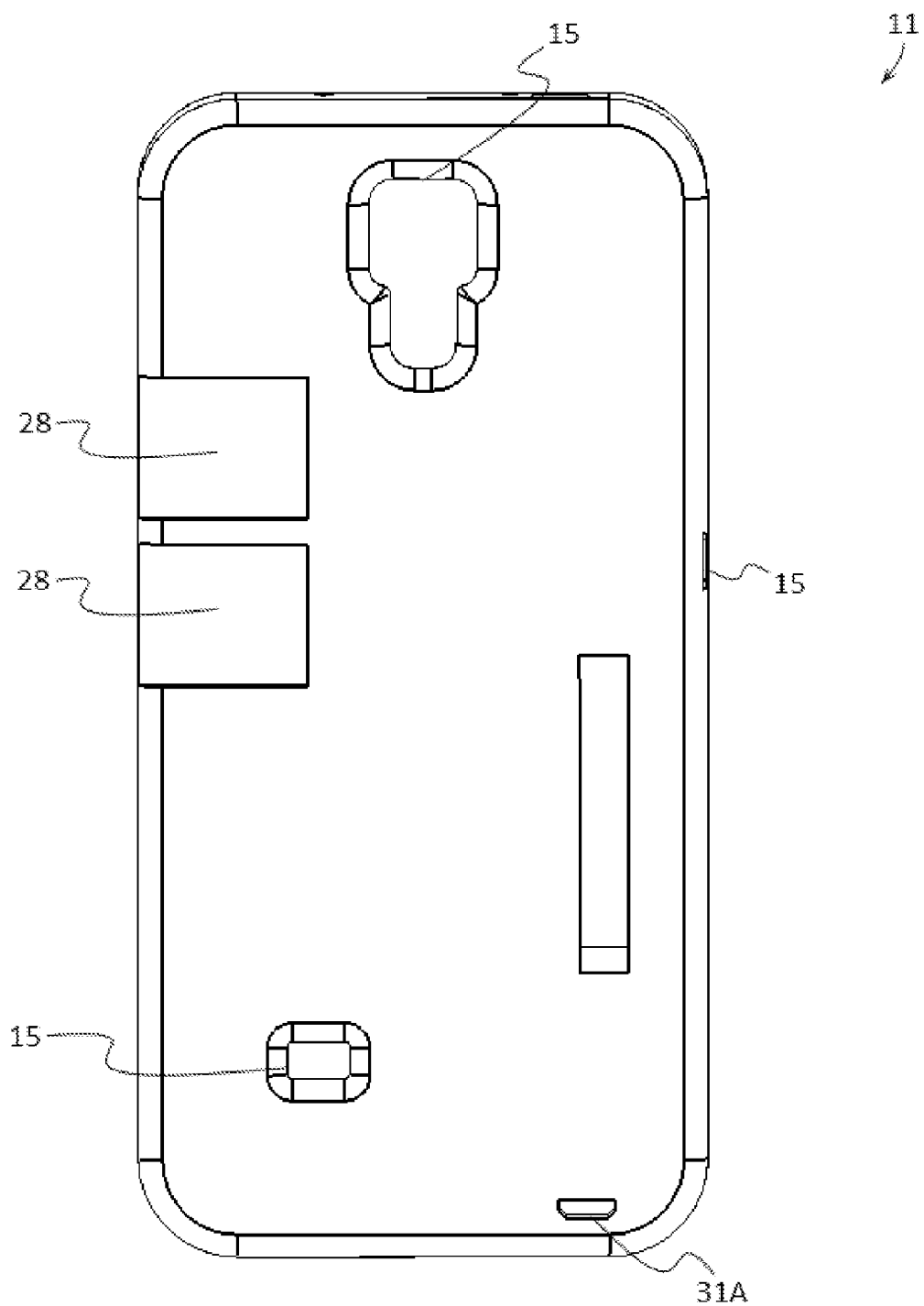
FIG. 12 shows a back elevation view of an example of a protective shell according to various embodiments described herein.
Figure 13:
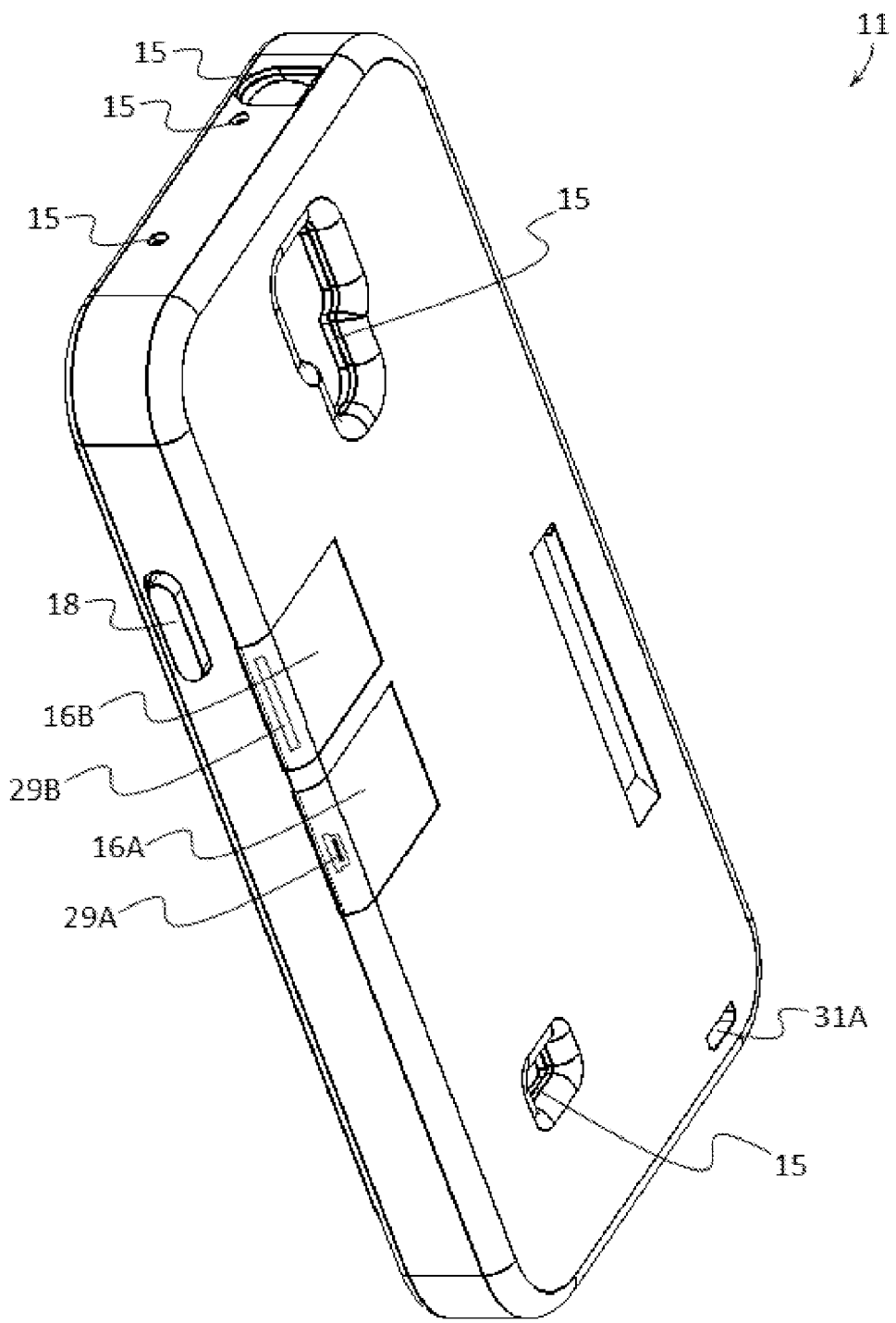
FIG. 13 depicts a back perspective view of an example of protective shell according to various embodiments described herein.

In some embodiments, FIGS. a protective shell 11 may comprise a circuit board depression 32 (FIGS. 4, 9-11) configured to receive a circuit board 13 to provide space for the circuit board 13 to be coupled between the protective shell 11 and a back plate 12. In further embodiments, a protective case 11 may comprise one or more conduits 36 or depressions configured to receive electrical connections providing electrical communication between the circuit board 13 and a electrical component disposed on the protective case 11 such as a female plug connector 29A (FIGS. 1 and 3). A protective shell 11 may also comprise a kickstand 37 as shown in FIGS. 3, 12, and 13 which may be connected with a hinge or other movable coupling. A kickstand 37 may be moving into position so that a portion of the kickstand 37 extends away from the case 100 and contacts a surface allowing the case 100 to lean on the kickstand 37.

As shown in FIGS. 1 and 2, when assembled together, a back plate 12 and optionally the protective shell 11 and/or circuit board 13 may define a back plate opening 25 in the front of the case 100 configured to receive a portable device. In other alternative embodiments, the protective shell 11 may define a protective shell opening 26 (FIGS. 9-11) in the front of the case 100 configured to receive a portable device through which the user can view and access the touch screen, home button, and other like components of the portable device. As shown in these figures, a protective shell opening 26 may have a generally rectangular prism shape which is open on the front side, with the shape of the back protective shell opening 26 configured to be generally complementary in shape to a portable device also configured with a generally rectangular prism shape. In other embodiments, a protective shell opening 26 may comprise any other shape, allowing the protective shell opening 26 to receive any other shaped portable device so that the display screen and optionally one or more user inputs on the front of the portable device may be accessed.

In some alternative embodiments, the shape of a protective shell opening 26 opening may be configured to be slightly smaller than the shape of a portable device that is to be received into the case 100 with portions of the protective shell 11 that surround or form the protective shell opening 26 comprising a resilient material. The resilient material may be conformed around portions of a portable device received in the protective shell opening 26 of the case 100 with the resilient nature of the material frictionally securing the portable device within the protective shell opening 26.

In further alternative embodiments, the shape of the protective shell opening 26 may be configured to be generally the same size and shape of a portable device that is to be received into the case 100 with portions of the protective shell 11 configured to temporarily conform around portions of a portable device received in the protective shell opening 26 of the case 100. For example, the protective shell 11 may comprise two or more temporarily coupled subunits which when uncoupled may be place around portions of a portable device and then coupled to secure the portable device within the protective shell opening 26.

In the preferred embodiment shown in FIGS. 1, 2, 4-6, the back plate 12 may comprise a back plate opening 25 configured to receive a portable device through which the user can view and access the touch screen, home button, and other like components of the portable device. As shown in these figures, back plate opening 25 has a generally rectangular prism shape which is open on the front side, with the shape of the back plate opening 25 configured to be complementary in shape to a portable device also configured with a generally rectangular prism shape. In other embodiments, a back plate opening 25 may comprise any other shape, allowing the back plate opening 25 to receive any other shaped portable device so that the display screen and optionally one or more user inputs on the front of the portable device may be accessed.

The shape of the back plate opening 25 may be configured to be slightly smaller than the shape of a portable device that is to be received into the case 100 with portions of the back plate 12 that surround or form the back plate opening 25 comprising a resilient material. The resilient material may be conformed around portions of a portable device received in the back plate opening 25 of the back plate 12 with the resilient nature of the material frictionally securing the portable device within the back plate opening 25. Also in preferred embodiments, the protective shell 11 may comprise a protective shell opening 26 configured to receive and secure the back plate 12 with a portable device received and secured in the back plate opening 25 of the back plate 12.

In some embodiments, the shape of the protective shell opening 26 may be configured to be slightly smaller than the shape of the back plate 12 that is to be received into the protective shell opening 26 of the protective shell 11 with portions of the protective shell 11 that surround or form the protective shell opening 26 comprising a resilient material. The resilient material may be conformed around portions of a back plate 12 received in the protective shell opening 26 of the protective shell 11 with the resilient nature of the material frictionally securing the back plate 12 within the protective shell opening 26. In other embodiments, the shape of the protective shell opening 26 may be configured to be generally the same size and shape of a back plate 12 that is securing a portable device that is received into the back plate opening 25 with portions of the protective shell 11 configured to temporarily conform around portions of a back plate 12 received in the protective shell opening 26 of the protective shell 11. For example, the protective shell 11 may comprise two or more temporarily coupled subunits which when uncoupled may be placed around portions of a back plate 12 and then coupled to secure the back plate 12 within the protective shell opening 26 of the protective shell 11.

As shown in FIGS. 1-13, in preferred embodiments, a protective shell 11 and a back plate 12 may comprise one or more apertures 15 which may be positioned and configured to allow elements of a portable device such as a camera, flash, microphone, head set or head phone connection, power buttons, volume buttons, other buttons, and the like to be unobstructed by the protective shell 11 and/or a back plate 12 when the portable device is received or secured within the protective shell opening 26 and/or back plate opening 25 of the case 100. One or more apertures 15 may be located anywhere on a protective shell 11 and/or anywhere on a back plate 12. In further embodiments, an aperture 15 may be configured to receive or secure a portion of an expansion module 16 or other accessory.

A protective shell 11 and/or a back plate 12 may also comprise one or more input toggles which may be configured to physically communicate manual inputs such as a depressing motion to a user input such as a power button or volume button on a portable device received and secured within an opening 14 of an case 100 as illustrated in FIGS. 1-13. An input toggle may be positioned on the protective shell 11 and/or back plate 12 so that when a portable device is received in the case 100, a portion of the input toggle is configured to contact a user input on the portable device.

In some embodiments, an input toggle may comprise a power button toggle 18 which when pressed, may communicate the force of the press to the power button user input on a portable device received in the case 100, thereby toggling the power button of the portable device. In other embodiments, an input toggle may comprise a volume button toggle 19 which when pressed, may communicate the force of the press to a volume button user input on a portable device received in the case 100, thereby toggling the volume button of the portable device. In further embodiments, an input toggle may comprise a home button toggle which when pressed, may communicate the force of the press to the home button user input on a portable device received in the case 100, thereby toggling the home button of the portable device. In still further embodiments, an input toggle may comprise a camera button toggle which when pressed, may communicate the force of the press to the camera button user input on a portable device received in the case 100, thereby toggling the camera button of the portable device. In even further embodiments, an input toggle may comprise a button toggle which when pressed, may communicate the force of the press to any other type of button, slider, rocker, or like type of user input on a portable device received in the case 100, thereby toggling any other type of user input on a portable device.

Figure 15:
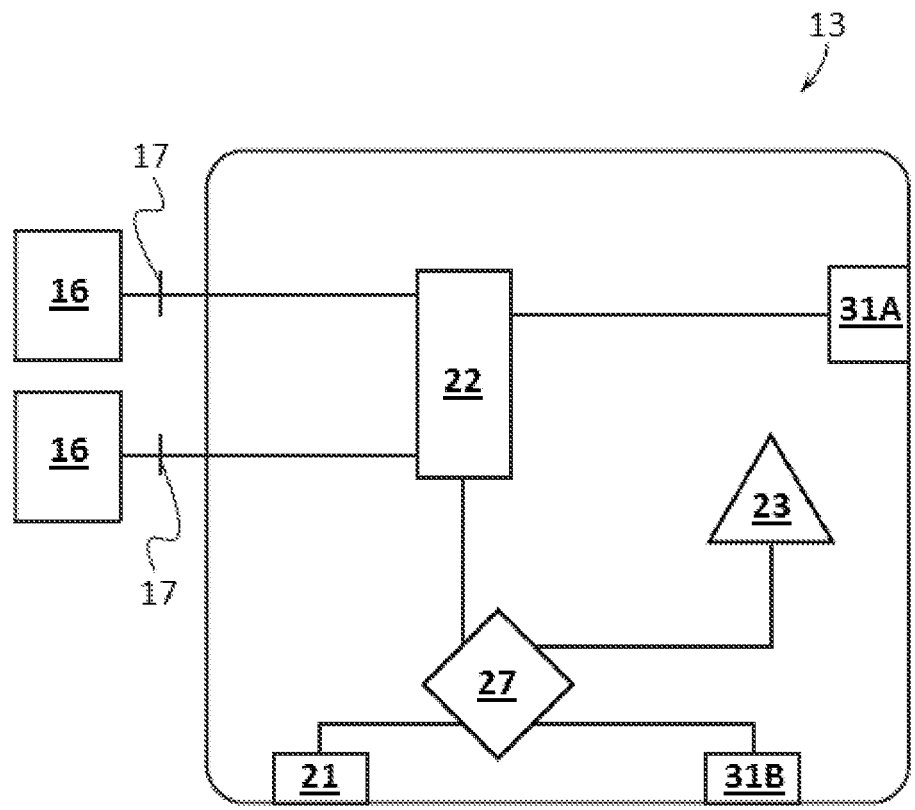
FIG. 15 shows a circuit block diagram for a circuit board of an example of an expandable and modular protective mobile device case apparatus according to various embodiments described herein.
Figure 16:
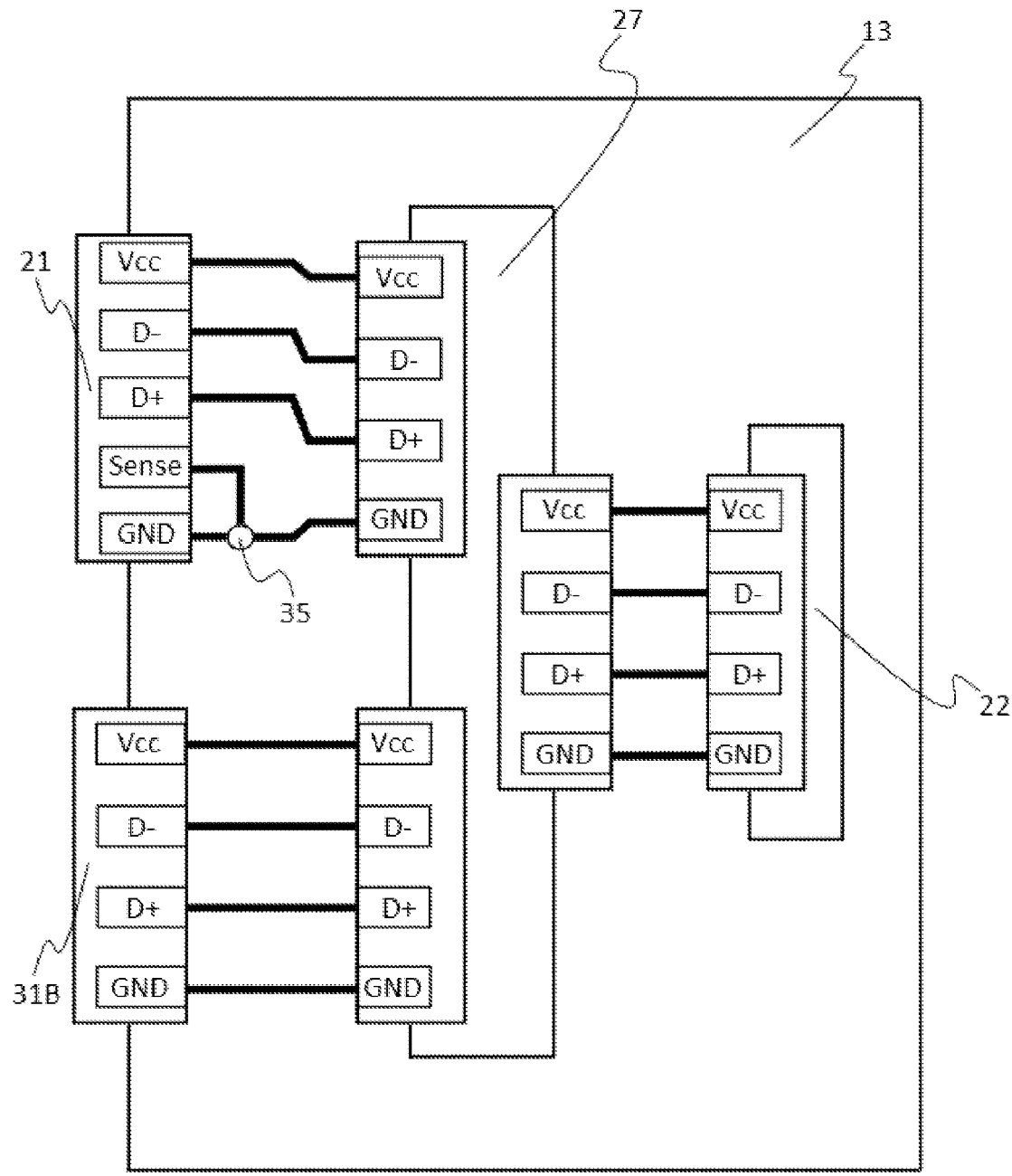
FIG. 16 depicts a circuit block diagram of a mode selection switch of an example of an expandable and modular protective mobile device case apparatus according to various embodiments described herein.
Figure 17:
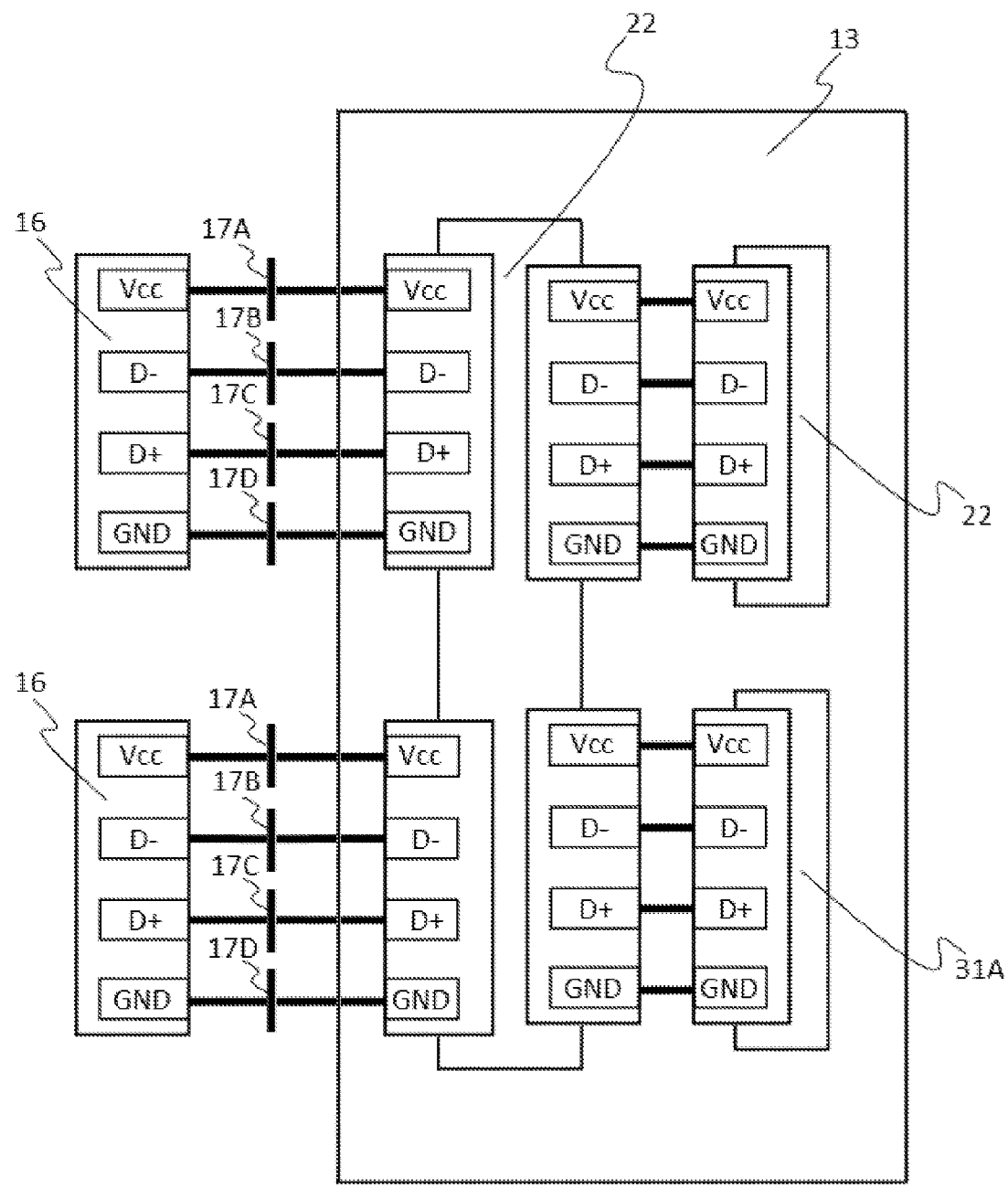
FIG. 17 illustrates a circuit block diagram of a USB hub of an example of an expandable and modular protective mobile device case apparatus according to various embodiments described herein.

In the embodiments shown in FIGS. 3, 4, 10, and 12, a protective shell 11 may comprise one or more expansion ports 28 configured to be coupled to, contain or grant access to an expansion module 16 (FIGS. 13 and 14). An expansion port 28 is configured to comprise one or more electrical contacts points 17 (FIGS. 3 and 9) which may be coupled in electrical communication with the circuit board 13. As shown in FIG. 3, the electrical contact points 17 may be configured to pass from an expansion port 28 through a protective shell 11, into the circuit board depression 32 (FIGS. 4, 9-11) and into electrical communication with an electrical component of the circuit board 13 such as a USB hub 22 (FIGS. 15 and 16). In preferred embodiments as shown in FIG. 17, an expansion port 28 may comprise a V+ or VCC +5 V (red wire) electrical connection point 17A, a D+ or Data+ (green wire) electrical connection point 17B, a D− or Data− (white wire) electrical connection point 17C, and a GND or Ground (black wire) electrical connection point 17D similar to those commonly used in USB standard connections. In other embodiments, an expansion port 28 may comprise one or more other electrical connection points 17 which may provide electrical communication with a circuit board 13.

In preferred embodiments, an expansion module 16 may be temporarily coupled into or to an expansion port 28 of the protective shell 11 allowing different types of expansion modules 16 to be electrical communication with the circuit board 13 with any suitable coupling or connection method. For example in the embodiment depicted in FIG. 13, the expansion module 16 may be temporarily secured or coupled in an expansion port 28 by a push-to-lock connection method allowing different types of expansion ports 16 to be temporarily coupled in an aperture 15 to a circuit board 13. In some embodiments, an expansion module 16 may be permanently coupled to a circuit board 13, back plate 12, and/or a protective shell 11. In other embodiments, an expansion module 16 may be temporarily coupled anywhere on the protective shell 11, preferably to one or more apertures 15 optionally providing electrical communication with the circuit board 13 allowing different types of expansion ports 16 to be temporarily coupled or attached to a circuit board 13 and/or a protective shell 11.

The an expansion module 16 may be coupled to the case 100 by being connected, removably connected, or integrally formed or molded with an expansion port 28 and/or the protective case 11. In some embodiments, an expansion module 16 may be coupled to an expansion port 28 and/or the protective case 11 with heat bonding, chemical bonding, adhesives, clasp type fasteners, clip type fasteners, rivet type fasteners, threaded type fasteners, other types of fasteners, or any other suitable joining method. In other embodiments, an expansion module 16 may be coupled to an expansion port 28 and/or the protective case 11 may be coupled or removably connected by being press fit or snap fit together, by one or more fasteners such as magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, an expansion module 16 may be coupled to an expansion port 28, the protective case 11, and/or any other component described herein may be coupled by being one of connected to and integrally formed with another component of the case 100.

As shown in FIG. 14, an expansion module 16 may comprise a first end 33 and a second end 34, and having electrical contact points 17 on the first end 33 and having a female connector 29 on said second end 34, the electrical contact points 17 on the first end 33 are adapted to operably engage or electrically communicate with the electrical contact points 17 of an expansion port 28. An expansion module 16 may comprise one or more temporary electrical connection points which may be configured to temporarily be in electrical communication with a circuit board 13. In preferred embodiments as shown in FIGS. 14 and 17, an expansion module 16 may comprise a V+ or VCC +5 V (red wire) electrical connection point 17A, a D+ or Data+ (green wire) electrical connection point 17B, a D− or Data− (white wire) electrical connection point 17C, and a GND or Ground (black wire) electrical connection point 17D similar to those commonly used in USB standard connections. In other embodiments, an expansion module 16 may comprise one or more other electrical connection points which may provide electrical communication with a circuit board 13.

In some embodiments, an expansion module 16 may be configured as a female plug member expansion module 16A (FIGS. 13 and 14A) which comprises a female connector such as a female micro-USB connector or female mini-USB connector. A female plug member expansion module 16A may be configured to provide electrical communication between a male connector such as a male micro-USB connector, male mini-USB connector, or any other type of male connector that is inserted into the female plug member expansion module 16A and the circuit board 13 allowing data and electricity to transfer between the male connector and the circuit board 13. In other embodiments, a female plug member expansion module 16A may comprise a female connector such as a Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a HDMI port, a Lightning plug, a30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of electrical communication with an electronic device.

In some embodiments, an expansion module 16 be configured as a memory card reader expansion module 16B (FIGS. 13 and 14C) which comprises a memory card connector such as a Micro SD card connector. A memory card reader expansion module 16B may be configured to provide electrical communication for the transfer of data between a memory card such as a Micro SD card that is inserted or received into the memory card reader expansion module 16B and the circuit board 13 allowing data to be read from and written to the memory card. In other embodiments, a memory card reader expansion module 16B may comprise a memory card reader configured to receive a PC Card memory card, CompactFlash I memory card, CompactFlash II memory card, SmartMedia memory card, Memory Stick memory card, Memory Stick Duo memory card, Memory Stick PRO Duo memory card, Memory Stick PRO-HG Duo memory card, Memory Stick Micro M2 memory card, Miniature Card memory card, Multimedia Card memory card, Reduced Size Multimedia Card memory card, MMCmicro Card memory card, P2 card memory card, Secure Digital card memory card, SxS memory card, Universal Flash Storage memory card, miniSD card memory card, xD-Picture Card memory card, Intelligent Stick memory card, Serial Flash Module memory card, μ card memory card, NT Card memory card, XQD card memory card, or any other removable memory storage device including USB flash drives.

In some embodiments, an expansion module 16 may be configured as a universal male or female connector type expansion module which comprises any other male or female connector which may be configured to provide electrical and optionally physical connection between a device comprising a male or female connector and the case 100 allowing data and electricity to transfer between the male or female connector of the device and the circuit board 13. A universal male or female connector type expansion module may comprise a V+ or VCC +5 V (red wire) electrical connection point, a D+ or Data+ (green wire) electrical connection point, a D− or Data− (white wire) electrical connection point, and a GND or Ground (black wire) electrical connection point similar to those commonly used in USB standard connections or any other type of electrical connection points and may be configured to provide electrical communication between a male or female connector that is inserted into the universal male or female connector type expansion module and the circuit board 13.

Turning now to FIG. 2, a protective shell 11 may also comprise a male plug member 21 which may be positioned in aback plate opening 25 and/or a protective shell opening 26 so that when a portable device is received in the case 100, the male plug member 21 may mate with a complementary female plug member such as a charging port or data port on the portable device. A male plug member 21 may provide electrical communication between a female plug member on a portable device and an electrical component of the circuit board 13 such as a mode selection switch 27 (FIGS. 15 and 16). A male plug member 21 may comprise any type of male plug connector commonly received or mated with any type of female plug member commonly found on portable devices.

In preferred embodiments, a male plug member 21 may comprise a male USB connector such as a male micro-USB or male mini-USB. In other embodiments, a male plug member 21 may comprise a male Type A USB plug, a male Type B USB plug, a male Mini-A USB plug, a male Mini-B USB plug, a male Micro-A USB plug, a male Micro-B USB plug, a male Micro-B USB 3.0 plug, a male ExtMicro USB plug, a male Lightning plug, amale30-pin dock connector, a male Pop-Port connector, a male Thunderbolt plug, a male Firewire plug, a male Portable Digital Media Interface (PDMI) plug, a male coaxial power connector plug, a male barrel connector plug, a male concentric barrel connector plug, a male tip connector plug, or any other male plug, connector, or receptacle capable of electrical communication with an electronic device.

Turning now to FIGS. 1, 3, 9, 12 and 13, a protective shell 11 may also comprise one or more female plug members 31 which may be positioned anywhere on a protective shell 11 and/or back plate 12. A female plug member 31 may provide electrical communication between a male plug member of an electrical device and an electrical component of the circuit board 13 such as a mode selection switch 27 (FIGS. 15 and 16) or a USB hub 22 (FIGS. 15-17). A female plug member 31 may comprise any type of male plug connector commonly received or mated with any type of male plug member commonly found on electrical devices. In some embodiments, a female plug member 31 may comprise a female connector such as a Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a Lightning plug, a 30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of electrical communication with an electronic device.

FIG. 15 depicts a circuit block diagram for a circuit board 13 of an example of an expandable and modular protective mobile device case 100 according to various embodiments described herein. In this embodiment, the circuit board 13 comprises a USB hub 22 in electrical communication with a mode selection switch 27, a first female plug member 31A, and two expansion modules 16, The circuit board 13 also comprises a mode selection switch 27 in electrical communication with a male plug member 21, the USB hub 22, a second female plug member 31B, and a wireless charging receiver 23. In other embodiments, the case 100 may comprise one or more male plug members 21, female plug members 31, expansion modules 16, and/or wireless charging receivers 23 which may be in electrical communication with a circuit board 13 by being temporarily or permanently coupled to a circuit board 13 and in electrical communication with one or more USB hubs 22. In further embodiments, the case 100 may comprise one or more male plug members 21, female plug members 31, expansion modules 16, and/or wireless charging receivers 23 which may be in electrical communication with a circuit board 13 by being temporarily or permanently coupled to a circuit board 13 and in electrical communication with one or more mode selection switches 27.

In preferred embodiments, a circuit board 13 may comprise a printed circuit board (PCB) which mechanically supports and electrically connects electronic components using conductive tracks, pads and other features etched from copper sheets laminated onto a non-conductive substrate. PCBs can be single sided (one copper layer), double sided (two copper layers) or multi-layer. Conductors on different layers may be connected with plated-through holes called vias. In some embodiments, a circuit board 13 may only comprise copper connections and no embedded components and may be called a printed wiring board (PWB) or etched wiring board. In other embodiments, a circuit board 13 may comprise a printed circuit assembly (PCA), printed circuit board assembly or PCB assembly (PCBA), a circuit card assembly (CCA), or a backplane assembly, or any other suitable electrical connection and communication method including standard wiring and the like.

As shown in FIG. 17, a USB hub 22 may comprise any type of device which is configured to connect the electrical connection points such as a V+ or VCC +5 V (red wire) electrical connection point 17A, a D+ or Data+ (green wire) electrical connection point 17B, a D− or Data− (white wire) electrical connection point 17C, and a GND or Ground (black wire) electrical connection point 17D from one USB port to the electrical connectors of another USB port. In this and preferred embodiments, a USB hub 22 may provide electrical communication between one or more expansion modules 16, optionally one or more first female plug members 31A, and a mode selection switch 27. In some embodiments, electrical contact points 17A-17D may be configured to be temporary in nature such electrical contact connectors. A USB hub 22 may be configured to connect two, three, four, five, six, seven, eight, or more USB ports including a female plug member 16 comprising USB type electrical connectors, expansion modules 16 comprising USB type electrical connectors, a mode selection switch 27 comprising USB type electrical connectors, or any other device comprising USB type electrical connectors together in electrical communication. In this embodiment, two expansion modules 16 may be connected to the USB hub 22 by connecting or inserting each expansion module 16 into one of the expansion ports 28 (FIGS. 3, 4, 10, and 12) as shown in FIG. 13.

In a similar fashion and in the example shown in FIG. 13, a memory card and a device comprising a male connector may be connected to a USB hub 22 by connecting or inserting a memory card into a memory card reader expansion module 16B and the male connector into the female connector of a female plug member expansion module 16A. In preferred embodiments, a memory card to USB data conversion integrated circuit common in the art may allow data and electrical connection between a memory card reader type expansion module 16B (FIGS. 13 and 14C) and the USB hub 22. By connecting a memory card to USB data conversion integrated circuit between the memory card reader type expansion module 16B and the USB hub 22, the memory card reader type expansion module 16B may be treated as a USB port by the USB hub 22. Likewise, an electronic device such as an external battery pack, a solar charger, an external camera attachment, or any other similar device comprising a male connector may be connected to a USB hub 22 by connecting or inserting the male connector of the device into a female connector of a female plug member expansion module 16A.

As shown in FIGS. 15-17, a USB hub 22 may preferably be in electrical communication with a mode selection switch 27 which may be configured to selectively provide electrical communication between one or more female plug members 31, a USB hub 22, a wireless charging receiver 23, and/or a male plug member 21. In preferred embodiments, a mode selection switch 27 may comprise an electronic mode switching using multi-input integrated circuit switch adapted to provided electronic mode switching between a plurality of data sources (i.e. data from a micro USB port and data from a microSD port). In some embodiments, the mode selection switch 27 may comprise a mechanical switch which may be manually operated by a user. In other embodiments, the mode selection switch 27 may comprise an integrated circuit mode selection switch which may be operated by software running on the portable device, the mode selection switch itself, and/or on the USB hub 22.

Turning now to FIG. 16, a mode selection switch 27 may comprise any type of device which is configured to connect the electrical connection points such as a V+ or VCC +5 V (red wire) electrical connection point 17A, a D+ or Data+ (green wire) electrical connection point 17B, a D− or Data− (white wire) electrical connection point 17C, and a GND or Ground (black wire) electrical connection point 17D from one electrical component to another electrical component. In this and preferred embodiments, a mode selection switch 27 may provide electrical communication between one or more male plug members 21, one or more second female plug members 31B, and a USB hub 22. In preferred embodiments, the male plug member 21 may comprise a Sense electrical connection point 17E which may be joined to the GND or Ground (black wire) electrical connection point 17D through a Sense to GND resistor 35 which may have a resistance of between 0 and 200 k ohm. The electrical communication between the male plug member 21 and the mode selection switch may then comprise a USB OTG connection with the male plug member 21 comprising a Sense electrical connection point 17E connected to the ground electrical connection point 17D. In preferred embodiments, a Sense to GND resistor 35 may have a resistance of between 20 and 40 k ohm such as 36.5 k ohm In this embodiment, a wireless charging receiver 23 may be connected to the mode selection switch 27. A wireless charging receiver 23 may be configured to receive energy such as an electric charge from an external power supply through an inductive coupling and to communicate the energy to the mode selection switch and the male plug member 21 allowing the energy to inductively charge a portable device connected to the male plug member 21 or any other electrical device connected to the mode selection switch 27. In further embodiments, a wireless charging receiver 23 may be configured to receive energy or an electric charge from an external power supply through an inductive coupling and to communicate the energy to the USB hub 22 and therefore to any other female plug member 31 or expansion module 16 in electrical communication with the USB hub 22.

A mode selection switch 27 may be configured to change the mode of the case 100 by changing the electrical communication between the electrical components of the case 100 such as one or more expansion modules 16 in electrical communication with a USB hub 22, USB hubs 22, wireless charging receivers 23, female plug members 31, and/or male plug members 21. A mode selection switch 27 may further be configured to selectively interconnect or disconnect the electrical communication between of any of the electrical components of the case 100 such as one or more expansion modules 16, USB hubs 22, wireless charging receivers 23, female plug members 31, and/or male plug members 21 with any of the other electrical components.

In some exemplary embodiments, the mode of the case 100 may be set to provide or connect the electrical communication between a memory card inserted into a memory card reader expansion module 16B, a male plug connector inserted into a female connector of a female plug member expansion module 16A, a male plug connector inserted a first female plug member 31A (FIG. 15) and/or any other device in electrical communication with a USB hub 22 with the male plug member 21 which may be inserted into the female connector of a portable device received in the case 100. The mode selection switch 27 may be configured to set the case into a first mode, wherein the mode selection switch 27 is configured to provide electrical communication between the male plug member 21 and the USB hub 22, while disconnecting the electrical communication of the female plug member 31 from both the male plug member 21 and the USB hub 27. This mode, illustratively called Mobile Device to Memory Cards and Expansion Port Mode, would allow the portable device to electrically communicate a device connected to the USB hub 22 such as accessing files on a memory card that is placed into the memory card reader expansion module 16B, while also allowing the portable device to be connected to one or more external devices or modules which are in electrical communication with the USB hub 22. In this mode, the mode selection switch 27 may be configured to interconnect the electrical communication from the USB hub 22 to the male plug member 21. By directing the mode selection switch into this mode, the user can connect an external device or module (for example, battery module, memory card, solar charging module, pico-projector module, and the like) to the case 100 and the portable device could then electrically communicate with the device in electrical communication with the USB hub 22.

In some exemplary embodiments, the mode of the case 100 may be set to provide electrical communication between a portable device received in the case 100 in which the male plug member 21 is inserted into the female connector of the portable device and a male connector of an external device such as a computer that is inserted into a female plug member 31 which is in electrical communication with the mode selection switch 27. The mode selection switch 27 may be configured to set the case into a second mode, wherein the mode selection switch 27 is configured to provide electrical communication between the male plug member 21 and the second female plug member 31B, while disconnecting the electrical communication of the USB hub 22 from both the male plug member 21 and the second female plug member 31B. This mode, illustratively called Mobile Device to Computer Mode, would allow the external device to access files on the portable device. In this mode, the mode selection switch 27 may be configured to interconnect the electrical communication through the USB hub 22 of the male plug member 21 and the female connector expansion port 16A. By directing the mode selection switch into this mode, the user can connect the portable device to a computer for the purpose of syncing data between them while the portable device remains secured in the case 100.

In some exemplary embodiments, the mode of the case 100 may be set to provide electrical communication between a memory card inserted into a memory card reader expansion module 16B, and a male connector of an external device such as a computer that is in electrical communication with a second female plug member 31B in electrical communication with the mode selection switch 27. The mode selection switch 27 may be configured to set the case into a third mode, wherein the mode selection switch 27 is configured to provide electrical communication between the second female plug member 31B and an expansion module 16 in electrical communication with the USB hub 22, while disconnecting the electrical communication of the male plug member 21 from both the female plug member 31 and the USB hub 22. This mode, illustratively called Memory Card to Computer Mode, would allow the external device to access files on the memory card that is placed into the memory card reader expansion port 16B, without requiring the memory card to be disconnected from the female connector expansion port 16A or the portable device to be removed from the case 100. In this mode, the mode selection switch 27 may be configured to interconnect the electrical communication through the USB hub 22 of a memory card reader expansion port 16B and a female connector expansion port 16A. By directing the mode selection switch into this mode, the files on the memory card can be accessed directly from a computer while the portable device remains securely received in the case 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A case for mobile devices, the case comprising;
   a. a protective shell configured to receive a mobile device;
   b. a circuit board coupled to the protective shell said circuit board comprising a USB hub and a mode selection switch, wherein the USB hub is in electrical communication with the mode selection switch;
   c. a male plug member in electrical communication with the mode selection switch and configured to transfer electrical signals from the mode selection switch to the mobile device.

2. The case of claim 1, wherein the mode selection switch provides electronic mode switching between a plurality of data sources.

3. The case of claim 1, wherein the case comprises a first expansion port positioned within the protective shell and having electrical contact points in electrical communication with the USB hub.

4. The case of claim 2, wherein the case comprises a second expansion port positioned within the protective shell and having electrical contact points in electrical communication with the USB hub.

5. The case of claim 3, wherein the case is configured to temporarily couple a first expansion module within the first expansion port, said first expansion module having a first end and a second end, and having electrical contact points on said first end and having a female connector on said second end, the electrical contact points on said first end adapted to operably engage with the electrical contact points of the first expansion port.

6. The case of claim 5, wherein the female connector is a female plug connector configured to act as a micro USB port.

7. The case of claim 5, wherein the female connector is a female plug connector configured to act as a microSD port.

8. The case according to claim 5, wherein the case is configured to temporarily couple a second expansion module, said second expansion module having a first end and a second end, and having electrical contact points on said first end and having a female connector on said second end, the electrical contact points on said first end adapted to operably engage with the electrical contact points of a second expansion port.

9. The case according to claim 1, further comprising a wireless charging receiver 23 in electrical communication with the mode selection switch and adapted to receive an electrical charge from an external power supply and transfer the electrical charge to the portable device.

10. The case according to claim 9, wherein the mode selection switch provides electrical communication between the male plug member and the USB hub, said electrical communication comprising:
    a. a VCC +5 V electrical communication between the mode selection switch and the USB hub;
    b. a Data + electrical communication between the mode selection switch and the USB hub;
    c. a Data − electrical communication between the mode selection switch and the USB hub; and
    d. a Ground electrical communication between the mode selection switch and the USB hub.

11. The case according to claim 10, wherein the electrical communication between the male plug member and the mode selection switch is a USB OTG connection and the male plug member comprises a Sense electrical connection point connected to a Ground electrical connection point.

12. The case according to claim 11, further comprising a resistor between the Ground electrical connection point connection and the Sense electrical connection point.

13. The case according to claim 12, wherein the resistor has a resistance between 0 and 200 k ohms.

14. The case according to claim 13, wherein the resistor has a resistance of between 25-50 ohms.

15. The case according to claim 1, wherein the mode selection switch is configured to selectively provide electrical communication between the USB hub, a female plug member, and the male plug member.

16. The case according to claim 5, wherein the mode selection switch is configured to selectively provide electrical communication between the first expansion module in electrical communication with the USB hub, a female plug member, and the male plug member.

17. A case for mobile devices, the case comprising a protective shell layer, a circuit board secured within the shell layer configured to receive a plurality of data signals from a plurality of sources, a first expansion port configured to receive a first data signal and a second expansion port configured to receive a second data signal, said first and second expansion ports in electronic communication with the circuit board, and a male plug member in electronic communication with the circuit board and configured to transfer a data signal between a mobile device and the circuit board.

18. The case of claim 17, further comprising a first expansion module temporarily mounted within the protective shell layer and in electrical communication with the first expansion port and providing the first data signal.

19. The case of claim 18, further comprising a second expansion module temporarily mounted within the protective shell layer and in electrical communication with the second expansion port and providing the second data signal.

20. The case of claim 19, wherein the circuit board is configured to accept the first data signal from the first expansion module and the second data signal from the second expansion module and transfer the first and second data signals between a mobile device through the male plug member.

* * * * *